Patented Dec. 12, 1950

2,534,129

UNITED STATES PATENT OFFICE 2,534,129

DRY GRANULAR MIX

Wallace L. Howe, West Boylston, Mass., assignor to Norton Company, Worcester, Mass., a corporation of Massachusetts No Drawing. Application June 28, 1949, Serial No. 101,909

11 Claims. (Cl. 51—305)

The invention relates to dry granular mixes for the manufacture of abrasive products, to methods of making such mixes and to methods of making abrasive products, the mixes being made out of abrasive material such as silicon carbide or fused alumina and finely divided ceramic material such as a clay or clays for the production, after molding and firing, of vitrified abrasive products such as grinding wheels and the like. This application is a continuation in part of my copending application Serial No. 681,769, filed July 6, 1946 and now abandoned.

One object of the invention is to produce a dry granular mix from which grinding wheels and the like can be manufactured with automatic molding machinery.

Another object of the invention is to provide a dry granular mix of such free flowing characteristics that equivalent volumes will have the same weight thus adapting the mix to molding by automatic means to yield articles having the same volume structure. Another object is to provide a dry granular mix for rapidly producing grinding wheels in the "green" state, that need only to be fired in a kiln, for example, a continuous tunnel kiln. Another object of the invention is to provide a dry granular mix of the character indicated which will make a strong, green article. Another object is to make a dry granular mix of good molding quality which is also relatively indifferent to changes in atmospheric conditions, so that for example the mix can be used in automatic machines or the like for the manufacture of grinding wheels as well in tropical and humid climates as in dry, cold climates. Another object of the invention is to provide a mix which shall not stick in the hopper, to the molding cavity or to the upper plunger or to the ejector.

Another object of this invention is to provide a mix which can be handled and stored for indefinite periods without deterioration of its molding characteristics.

Another object of this invention is to make possible the production of very soft and porous structures.

Another object is to provide a dry granular mix from which uniformly accurately dimensioned abrasive and refractory articles can be made.

A general object of the invention is the high speed, low cost production of grinding wheels and the like. Another general object of the invention is the production of uniform vitrified abrasive articles by automatic machinery.

Other objects will be in part obvious or in part pointed out hereinafter.

The invention accordingly consists in the combinations of elements, arrangements of parts and in the several steps and relation and order of one or more of said steps to one or more of the others thereof, all as will be illustratively described herein and the scope of the application of which will be indicated in the following claims.

As conducive to a clearer understanding of the present invention, automatic machines for the continuous manufacture of pills, small cylindrical articles and even medium large cylindrical articles up to six inches in diameter are available on the market and have been for many years. Such machines, however, will quickly clog or fail to duplicate results in the manufacture of articles out of granular material if the granular material is not free flowing, either generally or under particular circumstances as on a humid day. Therefore a mix to be usable in such machines should be free flowing. Furthermore if the mix sticks to the mold cavity or to the plungers, the machine will produce one or many defective articles. Consequently the mix should have such characteristics that a complete "green" body is ejected every time the ejecting motion of the machine operates. On the other hand, the particles of the mix, after the pressing operation, must cohere to one another under pressure sufficiently to make a strong enough article. In the case of grinding wheels this cohesion imparts the so-called "green" strength to the article so that it can be handled, will not fall to pieces of its own weight, and will maintain its shape until firing in the kiln vitrifies it.

For the manufacture of certain products in automatic molding machines a homogeneous material is used. For example, in the manufacture of many articles, such as pills, the individual particles in the powder are usually finely divided and of the same order of magnitude regardless of the complexity of the substance from a chemical standpoint. Grinding wheels, however, customarily consist of at least two different materials, the hard abrasive particles and the vitrified bonding material which is made out of clays and other rocks, minerals and frits. This invention is concerned with grinding wheels and other abrasive or refractory bodies made out of hard refractory abrasive grain bonded with a vitrifiable material, that is to say, a material which can be vitrified in a kiln whether such material is made from clay or other rock, mineral or frit, or any combination thereof, whether the material is classified as a ceramic or a vitrifiable silicate or a combination of oxides or otherwise.

Consequently, the material with which this invention deals consists of composite particles each one being a particle of refractory abrasive material such as fused alumina or silicon carbide coated, in the usual case, with hundreds or thousands of particles of vitrifiable material as above described. According to the present invention wax is incorporated to maintain the minute particles of clay or frit in adherence to each other forming an envelope substantially coating and surrounding the abrasive granule. In a dry granular abrasive mix there should be a minimum of loose bond, that is to say bond not attached to an abrasive granule and in accordance with this invention that objective is achieved.

In accordance with the invention I provide a quantity of abrasive grain. This may be particles of silicon carbide or particles of fused alumina or other abrasives may be used, for example, corrundum which is a natural form of relatively pure crystalline alumina, or emery, or diamonds, for example crushed bort.

The particle size of the abrasive material is not critical. However it is unusual for a grinding wheel to have less than several hundreds of individual abrasive granules and most grinding wheels have many thousands of individual abrasive granules. Furthermore, the commercial demand for grinding wheels of grit size larger than 8 is small. The grit size is the number of divisions in a linear inch of screen which will just pass the abrasive of that grit size.

At the other end of the scale it is not customary to use fines much smaller than 600 grit size. In the usual case, especially for wheels under seven inches in diameter which can be made with available automatic machinery grit sizes from 220 at the small end to around 16 will be used, the bulk of the product being in the range between 30 and 120 grit size.

I provide an abrasive mixing machine of any variety known to the art. Many varieties of mixer are known in the abrasive industry. In general these machines involve a container and something to stir the contents of the container. I prefer the type known as a vertical spindle mixer which consists of a vertical spindle, which is rotated, on top of which is fixed a disc-like table which removably holds a large open top pan into which the abrasive is charged. This mixer further has one or more stationary plows which are lowered into the pan. The rotation of the pan and the stationary plows therein cause the granular abrasive material to flow in tortuous paths so that a thorough mixing is achieved.

I next provide a quantity of vitrifiable bond as above described. The particles of this bond are small and should be not larger than one third of the size of the abrasive grains dimensionally. This bond should be very dry and is placed in a hopper with a vibrator so that it can be sifted into the pan. When the clay, rock, mineral or frit, or combination thereof is thus sifted into the mixing pan which contains the abrasive and which is turning, a thorough mixture of abrasive and bond results. But no attachment of the bond to the abrasive grain will occur unless a further ingredient is added.

According to this invention, before the bond powder is added to the abrasive, I first add the wax which in one particular embodiment thereof is a wax emulsion. This, for example, may consist of 50% of ceresin wax (a microcrystalline paraffin wax) having a melting point of from 165° F. to 170° F. thoroughly emulsified to a creamy consistency with water and emulsifying agent, percentage being by weight. This wax since it has a melting point of from 165° F. to 170° F. will not soften during a hot day when, for example, the temperature of the mixing room may rise to 110° F. Any wax having a melting point above 100° F. might be used, but I prefer a wax having a melting point above 150° F. It is really a matter of how hot the storage bins and the mixing room etc. may become, and if these are all air conditioned a lower melting wax can be used, but if not it is safest to use a wax melting above 150° F. There are many waxes so I should not be limited to particular ones. Further examples of usable waxes will be given hereinafter.

As will hereinafter appear from the list of waxes given the chemical nature of waxes varies. In my invention the chemistry of the wax is not important but the physical properties are important. Consequently it is not possible to give a definition of "wax" from a chemical standpoint but it is possible to give such definition from a physical standpoint, because it is the physical qualities that count with the exception of the fact that the wax must readily burn without leaving any deleterious ash during the firing operation. Accordingly any substance is a wax within this invention which is—

1. Substantially completely combustible under 600° C.
2. Unctuous
3. Highly plastic and deformable
4. Lacking in tensile strength
5. Cohesive but only slightly adhesive
6. Possessing a high coefficient of friction
7. Non-elastic
8. Crystalline
9. Solid at room temperatures
10. Fusible under 300° F.

Accordingly, after the abrasive is placed in the mixing pan, the plows lowered into position and the switches closed so that the electric motor rotates the pan, I add a quantity of the above-described wax emulsion. I prefer a quantity of around 6% by weight of the wax emulsion based on the weight of the abrasive in the pan. However this may be varied from around 3% to 15%. In general with the smaller particle size of abrasive I use more of the wax emulsion. For mixtures of about 60 grit size with a small amount of bond, 6% of the wax emulsion is the best proportion now known to me, whereas with fine grit sizes such as 220 and a large amount of bond I prefer to use about 12% of the wax emulsion based upon the weight of the abrasive.

Mixing should be continued for about two minutes. This gives good results with the vertical spindle mixer rotating at 45 R. P. M. It is not detrimental to continue the mixing for a longer time up to twice or three times the foregoing, so if another mixer is used I recommend a longer period, for example, 10 minutes since this will not be detrimental and may be desirable.

I now add the bond while the pan is still rotating and the mixing is therefore continued. As above stated, the bond is slowly sifted into the mixing pan and I continue until all the bond is in the pan and for about three minutes thereafter. The length of time of mixing is dependent upon the revolutions per minute of the pan and the weight of the abrasive charge. For example, I might use a charge of abrasive of about 20 pounds in a twenty inch diameter pan and a speed of around 45 R. P. M. for which a mixing time of three minutes after the bond in all in the pan is satisfactory. Provided the pan is large enough to hold the abrasive without overloading, the plows are adequate, and the speed in R. P. M. is the same, the mixing time is about the same whether the charge of abrasive be large or small.

As the result of the foregoing mixing there is produced a dry granular mix the characteristics of which is that every abrasive granule is coated with wax emulsion and bond, the wax emulsion and bond are thoroughly mixed, and there is no surplus of either wax emulsion or bond which is not coated onto an abrasive granule. This mix however is not very dry. According to the invention the granular mix is now dried, but before describing the drying and the result thereof I shall give preferred examples of the bond.

For the manufacture of grinding wheels and other abrasive bodies a mixture of clays has been used. For example, 20 parts of ball clay and 50 parts of Albany slip clay and 30 parts of feldspar, all by weight, are thoroughly dried, crushed, ground and screened. I may use the above in a preferred form of the invention or I may use more recently developed bonds, as to which I will refer to the patents which describe them. U. S. Patent No. 1,829,761 to Saunders, Milligan and Beecher, granted November 3, 1931, describes an excellent vitrifiable bond especially for the manufacture of wheels with fused alumina abrasive. U. S. Patent No. 2,158,034 to Milligan and Lombard, dated May 9, 1939, describes an excellent bond for the manufacture of wheels using silicon carbide abrasive. U. S. Patent No. 2,309,463 to Lombard and Milligan, dated January 26, 1943, describes an excellent bond mixture for the manufacture of wheels with diamond abrasive. Many other bond mixtures for the manufacture of vitrified bonded abrasive products will be found in the patent literature, and I am not limited therein since any vitrifiable bond may be used. All of the bonds described or referred to herein are ceramic bonds.

With regard to the quantity of bond to be used this depends upon the grit size of the abrasive and structure of the grinding wheel to be achieved. Full instructions for the manufacture of abrasives of closely controlled structure are set forth in the U. S. Patent to Howe and Martin No. 1,983,082, dated December 4, 1934. Accordingly, while the quantity of bond is certainly an important matter this is a variable function of the volume percentage of abrasive and bond and is now well known to the art, so in practicing the present invention I use an amount of bond as desired to produce the desired structure. The relative volume percentages of abrasive, bond and pores depends not only on the weight percentage of abrasive and the weight percentage of bond but also on the amount of compacting of the dry granular mix, and this is controllable by the adjustment of the automatic molding machine which is used to make green bodies out of the dry granular mix of the invention. Such machines are not per se part of the present invention and the setting of the machine can be determined from the considerations in the Howe and Martin patent which is referred to above.

After mixing as above described the mix or a quantity thereof is preferably first screened and is then dried at a temperature of about 185° F. The temperature should be at or slightly above the melting point of the wax in order to improve the uniformity of the mixture of bond and abrasive. With regard to the time, so long as the temperature is kept at the limit indicated or below additional time does no harm. This drying eliminates practically all of the water from the wax emulsion at least down to .1% or .5% of water on the total wax plus water. The abrasive grains are now coated with dry wax and dry vitrifiable bond thoroughly mixed and there is no surplus thereof.

The mix is now carefully screened. If the grit size of the abrasive was 60, this will be increased to about 32 grit size by the addition of the wax and bond. In such case a screen of 32 meshes to the linear inch should be used. A finer screen may cause an unmixing, and a coarser screen will allow a cluster of two or more granules to pass through.

After the mix has thus been dried and screened, it is recharged into the clean pan of the same or a similar vertical spindle mixer. The pan is set in rotation, the plows are lowered, and then a quantity of anti-sticking agent is added. This anti-sticking agent functions to make the mix free flowing and it also functions to prevent the mix from sticking to the mold cavity or the plungers of the automatic molding machine.

The anti-sticking agent according to the present invention is amorphous carbon. This includes lamp black, gas black, powdered charcoal and all forms of carbon except diamond and graphite. This name "amorphous carbon" is the only generic name for this well recognized form of carbon, so I will use it herein even though some authorities insist it is crystalline after all. When the envelopes of ceramic bond and wax are coated with gas black or lamp black or pulverized charcoal, they are found to have a low coefficient of friction relative to each other. Thus the mix is free-flowing and furthermore it is water repellent and the particles will not stick to the mold or the dies of the molding machine. Yet when the plunger or die operates, the wax-containing envelopes of the particles flow together to form a continuous phase of bond and wax thus making an integral "green" articles. The quantity of amorphous carbon which should be added to the mix is form .75% to 2.5% by weight of the mix before the carbon is added. In most cases I use about 1.5% by weight of the amorphous carbon bond on the weight of the mix before the carbon is added. The particle size of this material is very small as is well known. While it slightly discolors the wheels in the "green" state, it readily burns out during firing (vitrifying) and is not observable in the fired or vitrified wheel.

Continuing now with the steps in the process, the mixing is continued after all the anti-sticking agent is added for about one half minute and it is undesirable to continue much longer. A shorter time would give some results but little is gained from being niggardly in this respect. The mixing is now completed and the mix may be dumped and used as desired. I have not found that any further screening is necessary but if lumps do occur, further screening would be indicated.

Thus each particle of the dry granular mix consists of a central nucleus of hard refractory abrasive, such as silicon carbide or fused alumina, coated with a thorough mixture of dry vitrifiable bond powder and a dry adherent wax, this coating forming an envelope enclosing the abrasive with a further very thin coating of the anti-sticking agent which adheres to the waxy particles of the adherent wax by reason of being practically embedded therein, but which offers no adhering attraction for other units by reason of the non-adhering, non-tacky qualities of the anti-sticking agent. Likewise the anti-sticking agent repells water.

This dry granular mix may now be handled with trowels or the like and charged into the hopper of an automatic molding machine which can then be set in operation and will turn out at a rapid rate pressed and formed "green" wheels or other shapes ready for the kiln. Such "green" shapes have enough strength to be easily handled and in fact are exceptionally strong. They may be placed on refractory batts, each batt holding a number of them and then the batts can be loaded into a continuous tunnel kiln for vitrifying for example at cone 12, and there emerges from the continuous kiln vitrified grinding wheels which are ready for use as soon as they have cooled down. With accurately dimensioned molding equipment so accurate is the manufacturing process when using my dry granular mix that truing and siding of the wheels may often be dispensed with and I have found in practice that I can hold them in diameter, thickness and diameter of central hole and roundness to within three or four thousands of an inch.

During the pressing operation the coating of the anti-sticking agent is ruptured and the bond coheres because the wax sticks together, joining granule to granule and forming a compact integral "green" article which can be readily handled. Prior to the pressing, however, the granules will not stick to each other nor to the parts of the machine, nor will they attract moisture.

As previously stated waxes other than ceresin wax can be used. Under some conditions any wax having a melting point above 100° F. can be used, but in most cases the wax should have a melting point above 150° F. and it is better that the melting point be 165° F. or above. The table is a list of waxes that can be used, showing the origin of the wax and in some cases its general chemical composition and indicating its melting point.

off without leaving any ash when placed in a vitrifying kiln.

Other methods of treating the material to incorporate the wax in the bond may be employed. I can use a water soluble wax which may be dissolved in water with reasonable stirring. The procedure when using a water soluble wax is first to charge the mixing pan with the abrasive and start the mixing machine in operation; second, add the desired quantity of the wax dissolved in water and continue the mixing until all the grains are coated with the solution; third, sift in the bond while continuing the mixing; fourth, after the grains are coated with bond as well as wax, dump the mixture and dry it in an oven or on a belt conveyor; fifth, screen the mixture until each granule coated with bond and wax is a distinct particle; sixth, recharge the screened mix into a clean mixing machine and set the machine in operation; seventh, sift in the anti-sticking agent while continuing the mixing.

The above described procedure may also be used with waxes dissolved in an organic solvent. All the waxes in the table may be dissolved in organic solvents such as petroleum ether, chloroform or acetone. However the water soluble wax is less soluble in these organics and consequently I prefer to use any of the others in the table. Any of these solvents can be readily driven off by the fourth step in the process which becomes a solvent evaporating step using either a belt conveyor adjacent to a source of heat or an oven.

Still another modification of the process can be used. I may melt the wax and add it to the abrasive in molten condition. Practically any wax can be melted including all those listed in the table. When carrying out the process in this manner it is desirable and in many cases necessary as a practical matter to heat the abrasive grain. It is preferable to heat the abrasive grain to about the melting point of the wax. Thus, proceeding in this manner, I first heat the abrasive grain to the desired temperature and at the same time melt the wax. Then the mixing machine is charged with the abrasive grain and preferably the mixing pan and the grain are kept hot as by the use of a heating lamp. Now, while the machine is in operation, the liquid wax is added. When the wax has coated all the granules, the bond is added while continuing the mixing. It is desirable that the bond also be heated before it is added to the pan.

Then the mixture is dumped and cooled, and

*Table*

| Wax | Origin | Chemistry | Melting Point |
|---|---|---|---|
| Carnauba | Vegetable | Fatty Acid Glyceride | 183° F. |
| Japan wax | do | do | 130° F. |
| Ceresin | Mineral | Hydrocarbon | Around 170° F. |
| Montan | do | do | 175° F. |
| Paraffin | do | do | Various. |
| Halowax | Synthetic | Chlorinated Diphenyl | 194° F. |
| Rilan wax | do | Chlorinated Hydrocarbon | 183° F. |
| Acrawax | do | Amide Fatty Acid and Ethylene Diamine. | 275° F. |
| Water Soluble wax. | do | Poly Ethylene Glycol (Molecular Weight 4000). | 130° F. |
| Beeswax | Animal | Fatty Acid Glyceride | 130° F. |
| Candellila | Vegetable | do | 130° F. |

The particular wax product which is now preferred is a water emulsion of a ceresin wax which consists of 50% of ceresin wax by weight emulsified with 42% by weight of water with 8% of triethanolamine stearate as an emulsifying agent. Other emulsifying agents could be used and many are known to the art. Most of them will pass when it is near room temperature it is screened, then recharged into a clean mixing pan and the anti-sticking agent is added while the mixer is in operation.

One important feature of the dry granular mix according to the invention is that it is free flowing. Using the wax first described, the mix has an angle or repose of about 30°. The automatic molding machines which are used to press the dry granular mix into green articles operate much better if the mixture used is free flowing. Such machines have a hopper which is charged with the material and ducts to lead the material to a mold cavity with means to stop and start the flow of material, and plungers to press the material. Accurate pressed pieces of the same volume structure can be made if the material is free flowing. If the material does not flow freely the machine will fail to fill the mold cavity or will jam or clog. In other words, if the material is not free flowing the purpose of the automatic machine may be defeated so far as production is concerned and also the machine may fail to produce uniform strong pieces. If the dry granular mix is made in accordance with the various embodiments of this invention, it is sufficiently free flowing to enable automatic molding machines to operate continuously, producing pressed green abrasive articles and the like which are uniformly accurately dimensioned and have the same weight and the same volume structure. It is possible, using the dry granular mix of the invention, molding it in an automatic molding machine and then firing the green articles, to produce grinding wheels which in diameter thickness and size of the central hole vary from each other by no more than two or three thousandths of an inch. Thus no truing operation on the grinding wheels is required and they are made to closer tolerances than was heretofore considered commercially practicable.

Another feature of the present invention is that molded pieces made from the dry granular mix hereof may be immediately fired without any intervening drying or baking operation after molding. This saves a great deal of handling of the pressed pieces, it saves time and labor, and it avoids the accumulation of inventory.

However, if the varying demands of commerce and industry make it desirable to store pressed green unfired grinding wheels, those made with the dry granular mix of the invention can be stored for a longer time than was hitherto practicable since they are stronger and will retain their strength over a long period. Perhaps a more important feature however is that the dry granular mix of the invention as such and before pressing into bodies can be stored for an indefinite period without deterioration. There is every reason to suppose that the dry granular mix of the invention can be stored for years and still successfully used.

The abrasives used in carrying out this invention are particularly the widely used abrasives fused alumina and silicon carbide (of various grades). Other forms of alumina such as corundum may be used. These have a hardness of 9 or more on Moh's scale. Emery, which is a natural but somewhat impure alumina, may be used if desired but is not likely to be used because it has been largely superceded for grinding wheels by the electric furnace products referred to as fused alumina. Emery has a hardness around 9 on Moh's scale.

All of the above are refractory as well as hard, that is they do not melt at the vitrifying temperatures. Diamonds are refractory in known firing procedures with the vitrifiable bonds suitable for diamonds now known to the art. The abrasive is therefore properly described as hard refractory material and it is more refractory than the vitrifiable bond.

This invention involves a new method of making abrasive products such as grinding wheels. After a dry granular mix as described herein has been made, it is placed in the hopper of an automatic molding machine which turns out pressed "green" wheels as above described. These are then taken to a suitable kiln, preferably for high speed production to a tunnel kiln, and vitrified at a maturing temperature for example of cone 12. This involves a top temperature usually of about 1200° C. or slightly above. During firing the wax and the anti-sticking agent burn and actually give off heat assisting the vitrification. It is found that the wax and the anti-sticking agent practically completely disappear leaving only a trace of ash which is not deleterious. In accordance with this invention, therefore, the manufacture of abrasive products has been greatly accelerated because automatic molding machines are used for the molding of the wheels. It is my belief that no one prior to my inventions hereof and of my aforesaid application Serial No. 681,769 successfully made grinding wheels in automatic molding machines and by successfully I mean without clogging of the molding machines and with the production of perfect pieces in quantities. Yet automatic molding machines for the manufacture of pressed products out of powders, such as for example tablets, have been available for more than 50 years.

It will thus be seen that there has been provided according to this invention a dry granular mix, a method of making it and a method of making grinding wheels according to which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:

1. A dry granular mix comprising particles of hard refractory material each coated with a considerable number of fine particles of vitrifiable ceramic bond mixed with wax, the bond and wax forming an envelope which surrounds a particle, each particle of refractory material having such envelope, and a coating of amorphous carbon powder on each such envelope.

2. A dry granular mix comprising particles of hard refractory material each coated with a considerable number of fine particles of vitrifiable ceramic bond mixed with wax having a melting point at least as high as 130° F., the bond and wax forming an envelope which surrounds a particle, each particle of refractory material having such envelope, and a coating of amorphous carbon powder on each such envelope.

3. A pressed "green" unfired ceramic body which is integral for handling and which comprises a great number of particles of refractory abrasive grain, each particle coated with an envelope of powdered vitrifiable ceramic bond mixed with wax and each envelope having a ruptured coating of amorphous carbon powder thereon, and the envelopes being stuck together adhesively by said wax to make said body integral.

4. A pressed "green" unfired ceramic body which is integral for handling and which comprises a great number of particles of refractory abrasive grain, each particle coated with an envelope of powdered vitrifiable ceramic bond mixed with wax having a melting point at least as high as 130° F. and each envelope having a ruptured coating of amorphous carbon powder thereon, and the envelopes being stuck together adhesively by said wax to make said body integral.

5. The method of making a dry granular mix for the subsequent manufacture of vitrified products which comprises mixing a quantity of refractory abrasive grain with a water emulsion of wax until each particle of the grain is coated with said wax emulsion, then adding a quantity of dry powdered vitrifiable ceramic bond of particle size smaller than that of the grain, further mixing the vitrifiable bond with the wax emulsion coated grain until the latter has picked up substantially all of the former thus forming an envelope of vitrifiable bond and wax on each particle, then drying the mix to evaporate the water, then screening the mix, then adding amorphous carbon powder and further mixing to coat each such envelope with said amorphous carbon powder.

6. The method of making a dry granular mix for the subsequent manufacture of vitrified products which comprises mixing a quantity of refractory abrasive grain with a water emulsion of wax having a melting point at least as high as 130° F. until each particle of the grain is coated with said wax emulsion, then adding a quantity of dry powdered vitrifiable ceramic bond of particle size smaller than that of the grain, further mixing the vitrifiable bond with the wax emulsion coated grain until the latter has picked up substantially all of the former thus forming an envelope of vitrifiable bond and wax on each particle, then drying the mix to evaporate the water, then screening the mix, then adding amorphous carbon powder and further mixing to coat each such envelope with said amorphous carbon powder.

7. The method of making a dry granular mix for the subsequent manufacture of vitrified products which comprises mixing a quantity of refractory abrasive grain with melted wax until each particle of the grain is coated with wax, then adding a quantity of dry powdered vitrified ceramic bond of particle size smaller than that of the grain, further mixing the vitrifiable bond with the wax coated grain until the latter has picked up substantially all of the former thus forming an envelope of vitrifiable bond and wax on each particle, later adding amorphous carbon powder and further mixing to coat each such envelope with said amorphous carbon powder.

8. The method of making a dry granular mix for the subsequent manufacture of vitrified products which comprises mixing a quantity of refractory abrasive grain with a solution of wax until each particle of the grain is coated with such solution, then adding a quantity of dry powdered vitrifiable ceramic bond of particle size smaller than that of the grain, further mixing the vitrifiable bond with the grain coated with solution of wax until the latter has picked up substantially all of the bond thus forming an envelope of bond wax and liquid solvent on each particle, then heating the mix to evaporate the solvent, then screening the mix, then adding amorphous carbon powder and further mixing to coat each such envelope with said amorphous carbon powder.

9. The method of making a dry granular mix for the subsequent manufacture of vitrified products which comprises coating each particle of a quantity of refractory abrasive grain with dry powdered vitrifiable bond and wax to form an envelope thereof on each such particle, then mixing said particles of grain having such envelopes with amorphous carbon powder to coat each such envelope with said amorphous carbon powder.

10. The method of making grinding wheels and the like which comprises coating a quantity of refractory abrasive grain with wax in a flowable condition, adding dry powdered vitrifiable ceramic bond and mixing until the bond has been picked up by the wax coated grain thus forming an envelope of vitrifiable bond and wax on each particle of the abrasive grain, then hardening the wax, screening the mixture, then adding amorphous carbon powder to the mixture and mixing to form a coating of said amorphous carbon powder on each envelope, placing a quantity of the mixture in the hopper of an automatic molding machine, setting the machine in operation thus producing pressed "green" wheels, then vitrifying the "green" wheels in a kiln.

11. Method of making grinding wheels and the like according to claim 10 in which the wax in a flowable condition is a water emulsion of wax and in which, prior to screening the mixture, most of the water is driven from the said emulsion of wax by heating thus hardening the wax.

WALLACE L. HOWE.

REFERENCES CITED

The following references are of record in the file of this patent:

UNITED STATES PATENTS

| Number | Name | Date |
|---|---|---|
| 2,150,034 | Melton et al. | Mar. 7, 1939 |
| 2,460,977 | Davis et al. | Feb. 8, 1949 |
| 2,463,679 | Buckey | Mar. 8, 1949 |

OTHER REFERENCES

Condensed Chemical Dict., 3rd edition, Reinhold Pub. Corp., 1942, page 672.